United States Patent
Groves, II et al.

(10) Patent No.: US 10,519,779 B2
(45) Date of Patent: Dec. 31, 2019

(54) RADIAL CMC WALL THICKNESS VARIATION FOR STRESS RESPONSE

(71) Applicant: General Electric Company, Schenectady, NY (US)

(72) Inventors: Robert Charles Groves, II, West Chester, OH (US); Kirk Douglas Gallier, Liberty Township, OH (US); Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 810 days.

(21) Appl. No.: 15/071,443

(22) Filed: Mar. 16, 2016

(65) Prior Publication Data

US 2017/0268345 A1 Sep. 21, 2017

(51) Int. Cl.
*F01D 5/18* (2006.01)
*F01D 9/04* (2006.01)

(52) U.S. Cl.
CPC .............. *F01D 5/186* (2013.01); *F01D 9/041* (2013.01); *F05D 2220/32* (2013.01); *F05D 2250/90* (2013.01); *F05D 2260/202* (2013.01); *F05D 2300/6033* (2013.01)

(58) Field of Classification Search
CPC .......... F01D 5/186; F01D 9/041; F01D 5/147; F05D 2300/6033; F05D 2220/32; F05D 2260/202
See application file for complete search history.

(56) References Cited

U.S. PATENT DOCUMENTS

| | | | | |
|---|---|---|---|---|
| 4,786,233 A | * | 11/1988 | Shizuya | F01D 5/187 416/90 R |
| 5,100,293 A | * | 3/1992 | Anzai | F01D 5/186 416/96 A |
| 5,232,343 A | * | 8/1993 | Butts | F01D 5/187 415/115 |
| 6,139,258 A | * | 10/2000 | Lang, III | F01D 5/141 415/115 |
| 6,142,734 A | * | 11/2000 | Lee | F01D 5/189 249/117 |
| 6,325,593 B1 | * | 12/2001 | Darkins, Jr. | F01D 5/186 415/115 |
| 6,884,036 B2 | * | 4/2005 | Shi | F01D 5/187 415/115 |
| 6,890,153 B2 | * | 5/2005 | Demers | F01D 5/186 415/1 |

(Continued)

FOREIGN PATENT DOCUMENTS

WO WO 2014/160299 A1 10/2014

*Primary Examiner* — Eldon T Brockman
(74) *Attorney, Agent, or Firm* — Dority & Manning, P.A.

(57) ABSTRACT

An airfoil having a radial direction extending away from an engine axis is provided. The airfoil includes an airfoil wall having an airfoil outer surface and an airfoil inner surface, with the airfoil extending radially from a first end to a second end. The airfoil defines a cooling channel interior to the inner surface with a thickness being defined between the airfoil outer surface and the airfoil inner surface. The thickness varies in the radial direction from the first end to the second end along at least one radial cross-section of the airfoil. A turbine nozzle of a turbine engine is also provided, which may include an outer band, an inner band, and the airfoil.

20 Claims, 5 Drawing Sheets

(56) References Cited

U.S. PATENT DOCUMENTS

| | | | | |
|---|---|---|---|---|
| 7,104,757 B2* | 9/2006 | Gross | F01D 5/187 | 415/115 |
| 7,435,058 B2* | 10/2008 | Campbell | F01D 5/14 | 416/232 |
| 8,210,803 B2* | 7/2012 | Schaff | F01D 5/147 | 415/200 |
| 8,690,538 B2* | 4/2014 | Levine | F01D 5/187 | 415/115 |
| 10,077,667 B2* | 9/2018 | Lewis | F01D 5/187 | |
| 10,119,404 B2* | 11/2018 | Srinivasan | F01D 5/187 | |
| 2001/0002667 A1* | 6/2001 | Jones | B23H 9/001 | 219/69.17 |
| 2004/0076519 A1* | 4/2004 | Halfmann | B22C 9/04 | 416/97 R |
| 2004/0096313 A1* | 5/2004 | Harvey | F01D 5/187 | 415/115 |
| 2004/0208744 A1* | 10/2004 | Shi | F01D 5/187 | 416/97 R |
| 2005/0084370 A1* | 4/2005 | Gross | F01D 5/187 | 416/95 |
| 2007/0297917 A1* | 12/2007 | Levine | F01D 5/187 | 416/96 R |
| 2008/0181766 A1* | 7/2008 | Campbell | F01D 5/14 | 415/116 |
| 2009/0047136 A1* | 2/2009 | Chon | F01D 5/187 | 416/97 R |
| 2009/0074575 A1* | 3/2009 | Propheter-Hinckley | F01D 5/186 | 416/95 |
| 2015/0110611 A1* | 4/2015 | Bergholz | F01D 5/187 | 415/178 |
| 2015/0322795 A1* | 11/2015 | Thomas | F01D 5/188 | 427/8 |
| 2016/0108740 A1* | 4/2016 | Srinivasan | F01D 5/188 | 60/806 |
| 2016/0326886 A1* | 11/2016 | Lewis | F01D 5/187 | |
| 2018/0156037 A1* | 6/2018 | Kraus | F01D 5/147 | |

* cited by examiner

RADIAL CMC WALL THICKNESS VARIATION FOR STRESS RESPONSE

FIELD OF THE INVENTION

The present subject matter relates generally to cooling of ceramic matrix composite (CMC) gas turbine engine airfoil components, and more particularly to stator vane components having an inner cooling channel.

BACKGROUND OF THE INVENTION

A turbofan type gas turbine engine includes a gas turbine core having a low pressure compressor, high pressure compressor, combustor, a high pressure turbine and a low pressure turbine in serial flow relationship. The gas turbine is operable in a known manner to generate a primary gas flow. The high pressure turbine and the low pressure turbine generally include annular arrays ("rows") of stationary vanes or nozzles that direct combustion gases exiting the combustor downstream into a corresponding row of rotating turbine blades. Collectively, one row of nozzles and one row of turbine blades make up a stage.

The rows of stationary vanes and turbine blades operate at extremely high temperatures and must be cooled by airflow or other cooling medium to ensure adequate service life. The stationary vanes are often configured as an annular array of stator components having airfoils or airfoil-shaped vanes that extend radially between annular inner and outer bands which at least partially define a primary flow or hot gas path through the nozzle.

The temperatures within gas turbines may exceed 2500° F. Due to these extreme operating temperatures within the gas turbine engine, it is desirable to utilize materials with a low coefficient of thermal expansion for the airfoils and/or the inner and outer bands. For example, to operate effectively in such strenuous temperature and pressure conditions, composite materials have been suggested, in particular for example, ceramic matrix composite (CMC) materials. Not only do the CMC materials have a relatively low coefficient of thermal expansion, but also CMC materials have higher temperature capability than metallic parts, thus allowing for higher operating temperatures within the engine resulting in higher engine efficiency.

However, components formed from ceramic materials still have local thermal stresses when exposed to hot gas within the turbine engine. There remains a need to tailor the local thermal stresses of cooled or uncooled CMC components in response to such hot gas loading.

BRIEF DESCRIPTION OF THE INVENTION

Aspects and advantages of the invention will be set forth in part in the following description, or may be obvious from the description, or may be learned through practice of the invention.

An airfoil of a turbine engine is generally provided that has a radial direction extending away from an engine axis. In one embodiment, the airfoil includes an airfoil wall having an airfoil outer surface and an airfoil inner surface, with the airfoil extending radially from a first end to a second end. The airfoil generally defines a cooling channel or cavity interior to the inner surface with a thickness being defined between the airfoil outer surface and the airfoil inner surface. Generally, the thickness varies in the radial direction from the first end to the second end along at least one radial cross-section of the airfoil. In certain embodiments, the airfoil defines at least one hot area on the airfoil outer surface of the leading edge portion, with the airfoil wall being thicker in the at least one hot area than on radially surrounding areas of the airfoil wall. For example, the airfoil outer surface can define a leading edge portion, a trailing edge portion, a pressure side wall, and a suction side wall, where the radial cross-section of the airfoil is on the leading edge portion.

A turbine nozzle of a turbine engine is also generally provided. In one embodiment, the turbine nozzle includes an outer band, an inner band, and an airfoil (such as described above).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
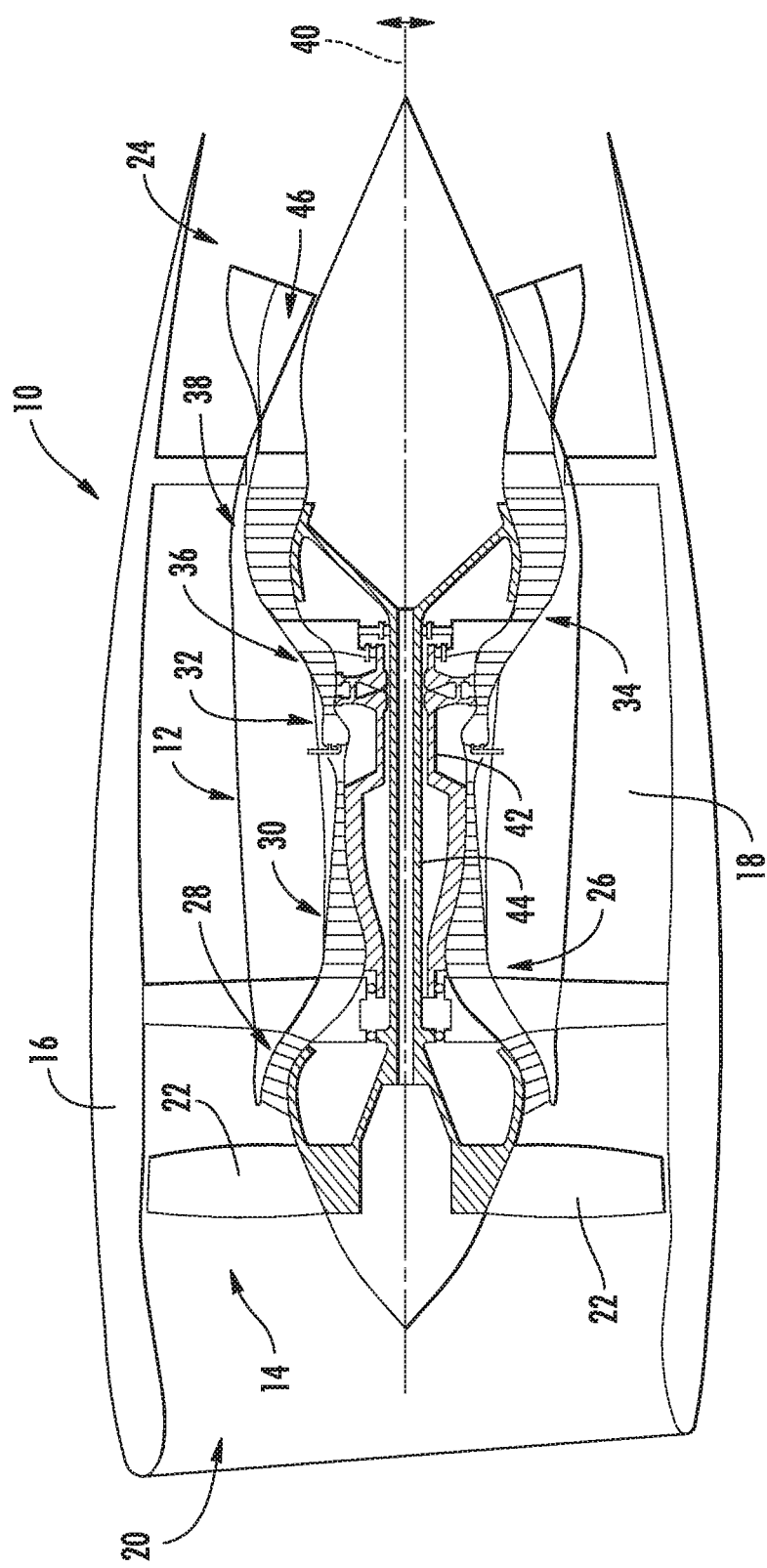
FIG. 1 is a schematic cross-sectional view of an exemplary high bypass turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The use of radially non-uniform CMC wall thickness distributions is generally provided so as to accommodate variation in the incident radial heat load variation from the hot gases. Accordingly, the radial thickness of the CMC wall can be tailored to address any local thermal stresses of cooled or uncooled CMC components in response to the hot gas loading. Due to the layered construction of a CMC component, the thickness of the component can be controlled on a localized basis through the ply and matrix construction of the component.

For example, when the component is an airfoil (e.g., turbine blade, turbine nozzle, or the like), a variation of thickness radially with respect to the engine's axis can function locally in each position on the airfoil so as to provide a local reduction in thermal-mechanical stress. Although described herein as turbine nozzle, the present application is not limited to turbine nozzles. The invention also applies to combustion nozzles, endwalls, shrouds, liners, center frames, and rotating blades, and on cooled or uncooled parts. In embodiments, the present description is particularly directed to CMC airfoils within a gas turbine engine, both rotating airfoils (i.e., blades) and stationary nozzles, vanes, and struts.

In one particular embodiment, the component is a cooled CMC airfoil (e.g., a turbine nozzle). In use, such a cooled CMC airfoil can lead to thermal stresses within the structure. The cooled component generally has local variations in wall thickness in at least a portion of the component, which can be tailored to hot gas loading and internal impingement cooling to maintain CMC and coating temperature limits. For example, the component can have a CMC wall varying in thickness, for example in a nozzle airfoil, to comply with the respective higher and lower external heat loads due to radial and circumferential variations in hot gas temperatures from the combustor, and the consequent CMC thermal stresses. Thus, any local thermal stresses of the CMC components can be tailored, with variable CMC wall thicknesses, to address local heat flux magnitudes in use in response to the hot gas loading.

CMC has the advantage of allowing ply and matrix construction on a very localized basis. As a non-limiting example, the wall thickness along the leading edge can be increased (i.e., thicker) to increase the components ability to withstand greater heat loading where the hot gas contacts the surface of the component. Where heat loads are less, the wall thickness can be thinner to lessen the through-thickness thermal stress imposed by temperature gradients, while also maintaining desirable absolute material temperatures, in-plane thermal gradients, and coolant conditions. Here, alternating the thickness of the CMC wall also allows local sections to share stress loads (thermal and/or mechanical) where local heat loading is greater. Additionally, the contoured profile of the radial cooling gap provides more surface area on the opposite surface (i.e., the inner surface) of the heat loaded surface to enable greater heat transfer out of the CMC component (cooling) at the areas where the heat is most loaded on the component. Thus, impingement cooling on the inner surface can be increased so as to remove heat from the locally heated portion. In particular, the thickness of the wall can be varied in the radial direction (i.e., extending away from the axis of the engine) along the length of the airfoil.

Referring now to the drawings, wherein identical numerals indicate the same elements throughout the figures, FIG. 1 is a schematic cross-sectional view of an exemplary high by-pass turbofan type engine or "turbofan" 10, as may incorporate various embodiments of the present invention. The turbofan 10 generally includes a gas turbine engine or propulsor 12, a fan section 14 that is mechanically coupled to the gas turbine engine 12 and a nacelle or outer casing 16 that extends circumferentially around at least a portion of the gas turbine engine 12. The nacelle 16 and the gas turbine engine 12 at least partially define a high by-pass duct 18 through the turbofan 10. The function of the gas turbine engine 12 is to extract energy from high pressure and temperature combustion gases and convert the energy into mechanical energy for work.

The nacelle 16 at least partially defines an inlet 20 of the turbofan 10. Air enters the turbofan 10 via the inlet 20 and passes across a plurality of fan blades 22 of the fan section 14. A primary portion of the air flows through the high by-pass duct 18 and is exhausted from an outlet or aft end 24 of the turbofan 10, thus providing a large portion of the overall thrust produced by the turbofan 10.

A secondary portion of the air is routed into a compressor section 26 of the gas turbine engine 12. The compressor section 26 generally includes, in serial flow order, a low pressure (LP) axial-flow compressor 28 and a high pressure (HP) axial-flow compressor 30. A combustion section 32 is disposed downstream from the compressor section 26 and a multi-stage turbine 34 is disposed downstream from the combustion section 32.

The multi-stage turbine 34 may include a high pressure (HP) turbine 36 and a low or lower pressure (LP) turbine 38 disposed downstream from the HP turbine 36. The compressor portion 26, the combustion section 32 and the multi-stage turbine 34 are all located along an engine axis 40. The HP turbine 26 is connected to the HP compressor 30 via rotor shaft 42. The LP turbine is connected to the LP compressor 28 via rotor shaft 44. The fan blades 22 may be connected to rotor shaft 44 via a reduction gear or may be coupled to rotor shaft 44 via various mechanical/structural means.

In operation, the compressed air from the compressor section 26 is mixed with fuel and burned in the combustion section 32, thus providing hot combustion gas which exits the combustion section 32 and flows into the HP turbine 36 of the multi-stage turbine 34. At the HP turbine 36, kinetic and thermal energy is extracted from the hot combustion gas causing rotation of turbine blades disposed within the HP turbine 36 which in turn causes rotation of rotor shaft 42. Rotation of rotor shaft 42 supports operation of the HP compressor 30. The combustion gas then flows from the HP turbine 36 to the LP turbine 38 where additional kinetic and thermal energy is extracted from the hot combustion gas causing rotation of turbine blades which in turn causes rotation of rotor shaft 44. The combustion gas is then exhausted from the multi-stage turbine 34 via turbine exhaust duct 46. Rotation of rotor shaft 44 supports operation of LP compressor 28 and causes rotation of the fan blades 22. Collectively, the gas turbine engine 12 and the fan section 14 contribute to produce overall thrust and/or power generated by the turbofan 10.

Figure 2:
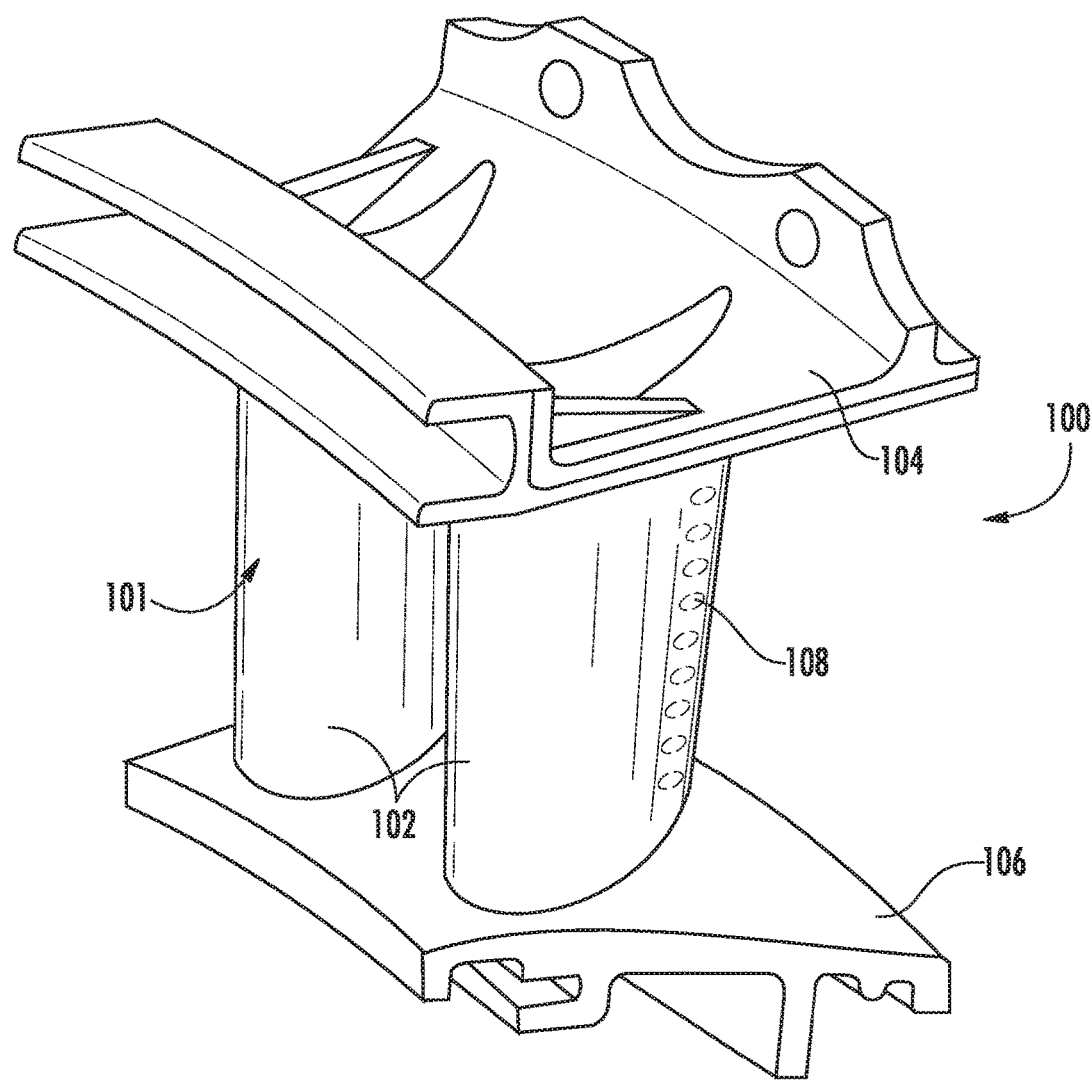
FIG. 2 is a perspective view of an exemplary nozzle segment for use within the engine of FIG. 1.

FIG. 2 provides a perspective view of an exemplary nozzle segment 100 as may incorporate various embodiments of the present disclosure. As shown in FIG. 2, each nozzle segment 100 includes at least one airfoil 102. For example, in the exemplary embodiment, as shown in FIG. 2, each nozzle segment 100 may include two airfoils 102 in a "doublet" configuration. In other configurations, each nozzle segment 100 may include one airfoil 102 in a "singlet" configuration (not shown).

As show in FIG. 2, each airfoil 102 defines an external surface 101 that extends radially, with respect to the engine's axis 40 from an inner band 104 and an outer band 106. The inner and outer bands 106, 104 define inner and outer flow boundaries for the combustion gas flowing through the nozzle segment assembly 100.

Figure 3:
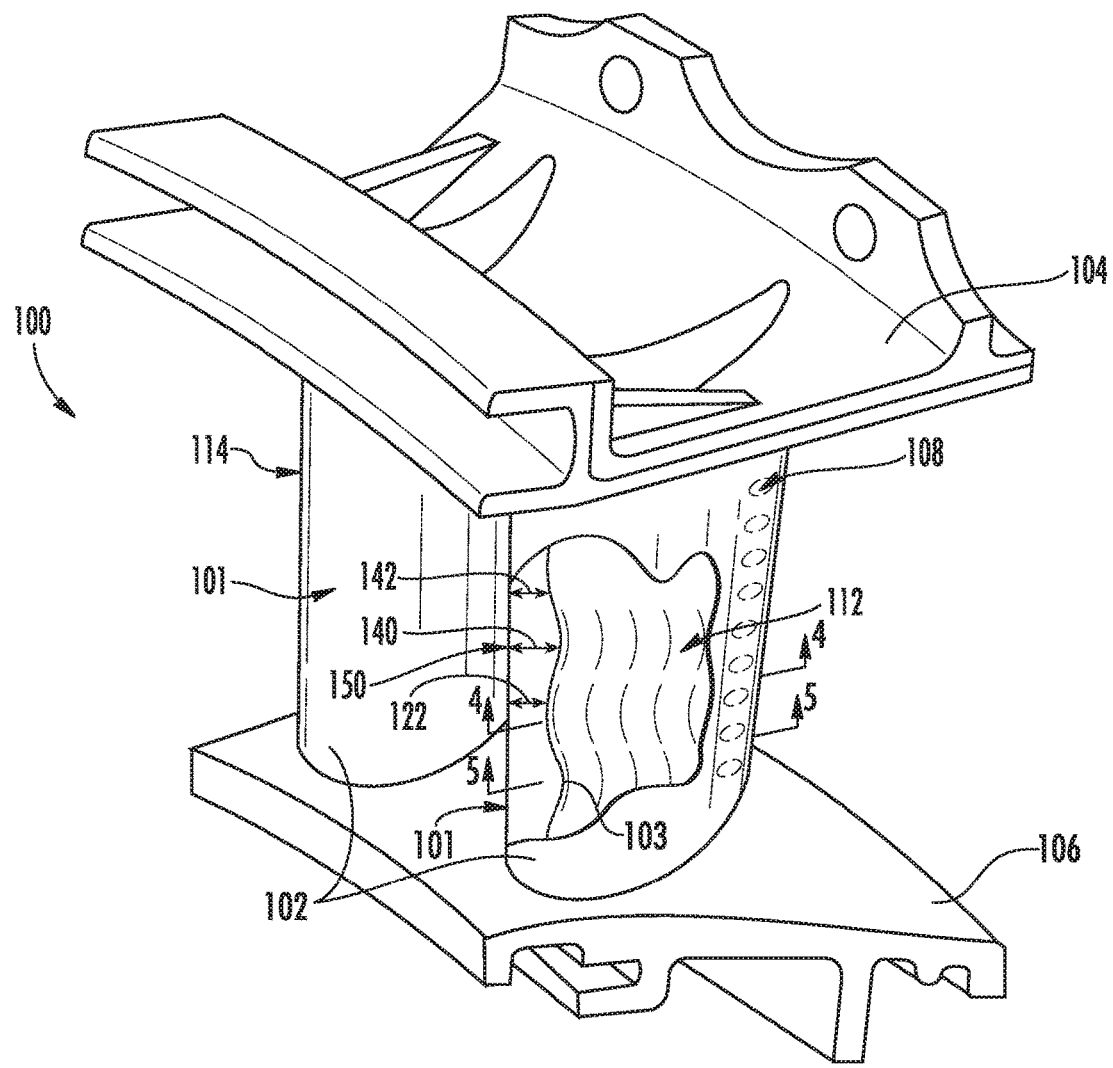
FIG. 3 is a perspective view of an exemplary nozzle segment for use within the engine of FIG. 1 with a cross-section taken from one of the vanes.

FIG. 3 shows the nozzle segment of FIG. 2, with a cross-sectional cut out along the leading edge 114 of one of the airfoils 102. As show, the thickness 122 is defined between the airfoil outer surface 101 and the airfoil inner surface 103. In the embodiment shown, the thickness 122 varies in the length of the airfoil 102 from the outer band 104 to the inner band 106, particularly within the leading edge portion 114. That is, the thickness varies radially from the direction of a first end (e.g., the outer band 104) to a second end (e.g., the inner band 106). For example, at least one thicker portion 140 is positioned on at least one hot area 150 of the airfoil outer surface 101. Generally, the thicker portion 140 in the at least one hot area 150 is thicker in the longitudinally surrounding areas of the airfoil wall 122 (i.e., thinner portions 142). That is, the airfoil wall 122 is thicker in the at least one hot area 150 than on surrounding areas 142 of the airfoil wall 122.

Figure 4:
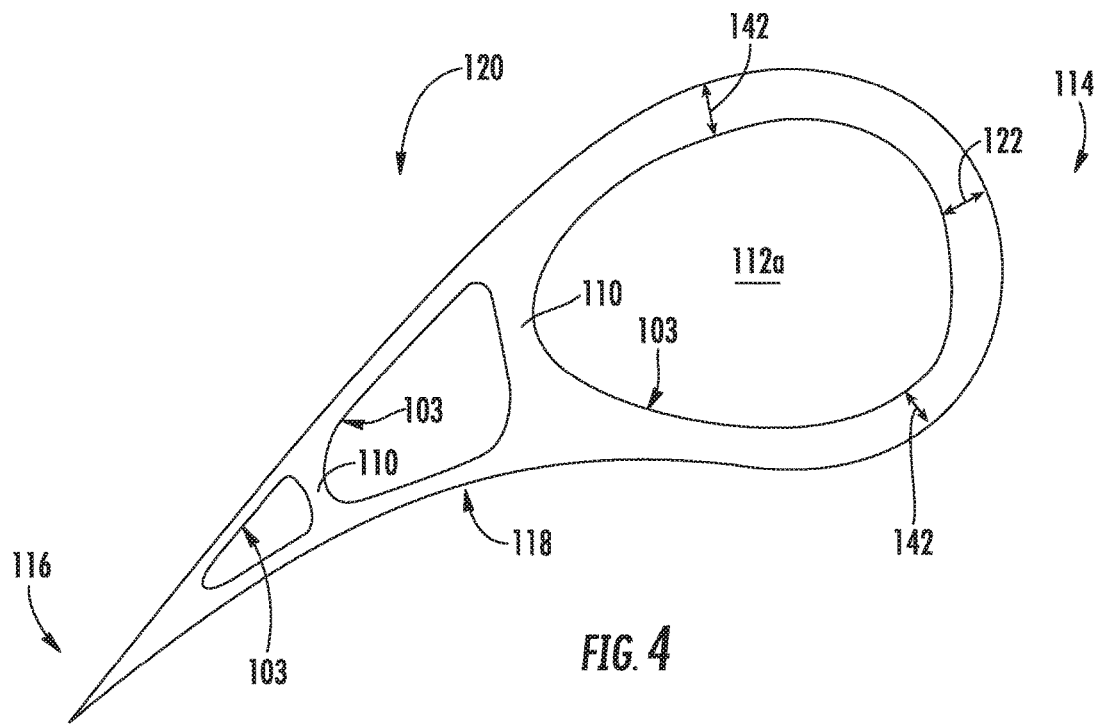
FIG. 4 is a cross sectional view of an exemplary airfoil suitable for use with the nozzle segment as shown in FIG. 2 or 3.
Figure 5:
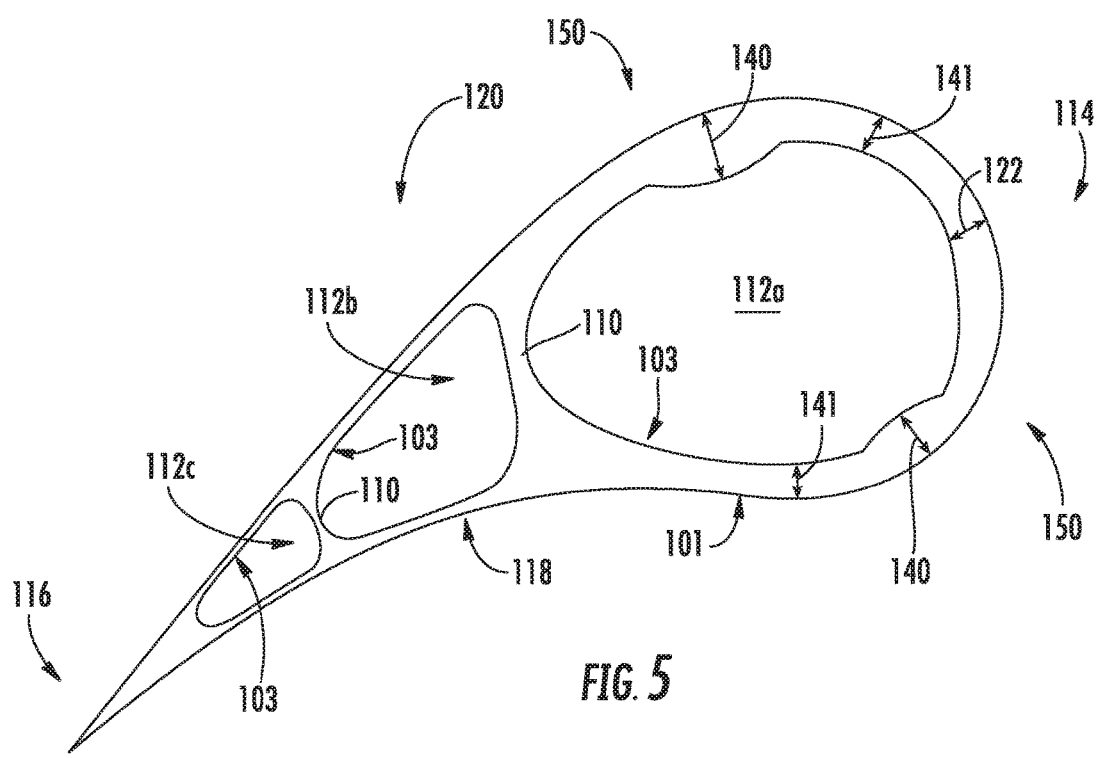
FIG. 5 is a cross sectional view of another exemplary airfoil suitable for use with the nozzle segment as shown in FIG. 2 or 3.

FIGS. 4 and 5 show cross-sections of the exemplary airfoil 102 of FIG. 3 taken across the airfoil 102 at different radial distances between the outer band 104 and the inner band 106. The airfoil 102 includes an airfoil outer surface 101 and an airfoil inner surface 103. The embodiment shown includes integral ribs 110 spanning from a first point on the airfoil inner surface 103 to a second point on the airfoil inner surface 103 to define separate inner cavities 112a, 112b, 112c, though the number of ribs and resulting cavities is not limited. However, in other embodiments, a single cavity 112 can be included (i.e., without any ribs therein). In such embodiments, a strut (not shown) or other support may be extended through the inner cavity of the airfoil 102 for support thereof on the nozzle segment 100. Additionally, the strut or other support can be utilized to provide impingement cooling on to the inner surface 103 of the airfoil 102, particularly onto hot zone areas of the airfoil during use.

Referring again to FIGS. 4 and 5, the airfoil 102 includes a leading edge portion 114, a trailing edge portion 116, a generally concave pressure side wall 118, and a generally convex suction side wall 120. In one embodiment, the leading edge 114 encompasses up to about the first 33% of the camber line of the airfoil 102 (e.g., about 10% to about 30% of the first length of the camber line). Conversely, the trailing edge 116 encompasses up to about the last 33% of the camber line of the airfoil 102 (e.g., about 10% to about 30% of the last length of the camber line). The pressure side 118 and the suction side 120 encompass the surface 101 between the leading edge 114 and the trailing edge 116 on their respective sides.

As shown, a thickness 122 is defined between the airfoil outer surface 101 and the airfoil inner surface 103, with the thickness varying radially (i.e., in the direction extending from the outer band 104 to the inner band 106). In the embodiment shown, the thickness 122 varies in the radial direction, particularly within the leading edge portion 114. For example, at least one thicker portion 140 is positioned on at least one hot area 150 of the airfoil outer surface 101, as shown in FIGS. 3 and 5. Generally, the thicker portion 140 in the at least one hot area 150 is thicker than the surrounding areas 141. Additionally, thinner portions 142 are defined radially in the same radial cross-section at a different point between the outer band 104 and the inner band 106, as shown in FIGS. 3 and 4. That is, the airfoil wall 122 has a thicker region 140 in the at least one hot area 150 than on radially surrounding areas 142 of the airfoil wall 122.

Figure 6:
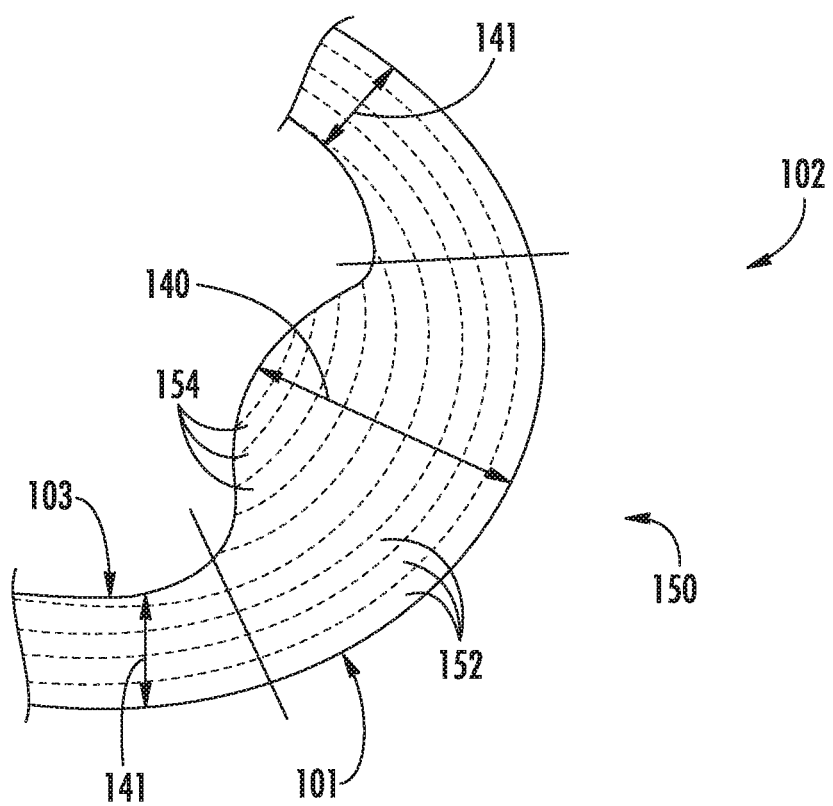
FIG. 6 is a close-up cross sectional view of an exemplary hot zone portion defining a relatively radially thick are on the exemplary airfoil of either FIG. 4 or 5.

In certain embodiments, the airfoil wall 122 is generally formed from a plurality of plies 152, as shown in FIG. 6. However, in the hot zone 150 (i.e., where the thermal load is applied during use) includes additional plies 154 on the airfoil inner surface 103 such that the thicker section 150 corresponds to a contour on the airfoil inner surface 103. That is, additional plies 154 are placed on the inner surface 103 to form the thicker section 140 in the hot area 150. However, the contour of the outer surface 103 (i.e., the external surface) is not affected by the thicker wall. As such, external hot gas airflow across the airfoil is unchanged.

The change in thickness (i.e., the variation between greatest thickness in the portion 150 and the thinner portion 142) is generally a function of the size of the component, and the type of component (e.g., rotating blade, stator vane, nozzle, etc.). However, in most embodiments, the thicker portion 150 is about 110% to about 250% of the thickness of the thinner portion 142.

In particular embodiments, the airfoil 102 may be formed from a relatively low coefficient of thermal expansion material, including but not limited to a ceramic matrix composite (CMC). Exemplary CMC materials may include silicon carbide, silicon, silica or alumina matrix materials and combinations thereof. In one embodiment, the CMC material used may be a continuous fiber reinforced CMC material. For example, suitable continuous fiber reinforced CMC materials include CMC materials reinforced with continuous carbon fibers, oxide fibers, silicon carbide monofilament fibers, and other CMC materials including continuous fiber lay-ups and/or woven fiber preforms. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). In other embodiments, the CMC material may be a discontinuous reinforced CMC material. For instance, suitable discontinuous reinforced CMC materials include particulate, platelet, whisker, discontinuous fiber, in situ, and nano-composite reinforced CMC materials.

In various embodiments, the airfoil 102 may include a plurality of film holes 108 defined along an outer surface 103 of the airfoil 102 and in fluid communication with the cooling channel to provide film cooling to the outer surfaces and/or portions of the airfoil 102. In addition, the film holes 108 provide for localized bore or through-hole cooling of the airfoil 102. For example, the airfoil 102 may include a plurality of film holes 108 along the pressure side wall and/or the suction side wall. The film holes 108 allow for localized bore or through-hole cooling of the airfoil 102. Other locations of the airfoil 102 may further comprise film holes 108 in order to provide a desirable operating temperature for the airfoil 102. In particular embodiments, the airfoil 102 may include a plurality of radially and/or axially spaced rows of the film holes 108. In particular embodiments, the films holes 108 may be from about 10 to about 30 mils in diameter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil of a turbine engine having a radial direction extending away from an engine axis, comprising:

an airfoil wall having an airfoil outer surface and an airfoil inner surface, the airfoil extending radially from a first end to a second end, wherein the airfoil outer surface has at least one locally heated portion defined by a peak of a temperature gradient, wherein the airfoil defines a cooling channel interior to the inner surface, wherein a thickness is defined between the airfoil outer surface and the airfoil inner surface, with the thickness varying in the radial direction from the first end to the second end along at least one radial cross-section of the airfoil, wherein the airfoil wall has at least one thicker portion positioned in alignment with the peak of the temperature gradient, the thicker portion being thicker than a surrounding area of the airfoil wall and configured to provide a local reduction in a thermal-mechanical stress associated with the peak of the temperature gradient, and wherein the thicker portion defines a contour on the airfoil inner surface.

2. The airfoil as in claim 1, wherein the airfoil outer surface defines a leading edge portion, a trailing edge portion, a pressure side wall, and a suction side wall, and wherein the radial cross-section of the airfoil is on the leading edge portion.

3. The airfoil as in claim 1, wherein the airfoil wall comprises a ceramic matrix composite formed from a plurality of plies, and wherein the thicker portion is defined by having more plies than adjacent sections.

4. The airfoil of claim 3, wherein the airfoil wall comprises a ceramic matrix composite formed from a plurality of plies having a varying length to form a rounded contour for the thicker portion, and wherein the thicker portion is defined by having more plies than adjacent sections.

5. The airfoil as in claim 3, wherein the thicker portion is tailored to address a local heat flux magnitude resulting from a localized thermal load on the airfoil during use of the turbine engine.

6. The airfoil as in claim 5, wherein the airfoil extends radially between an inner band and an outer band such that the airfoil forms a nozzle segment.

7. The airfoil as in claim 6, wherein a plurality of thicker portions and thinner sections are defined in the radial cross-section from the inner band to the outer band.

8. The airfoil as in claim 1, further comprising at least one rib extending from a first point on the airfoil inner surface to a second point on the airfoil inner surface.

9. The airfoil as in claim 1, further comprising:
a strut disposed within the radial cooling channel.

10. The airfoil as in claim 9, wherein the strut comprises a metal.

11. The airfoil as in claim 9, wherein the strut has an outer surface that defines a plurality of apertures that provide for fluid communication to the inner radial cooling passage.

12. The airfoil as in claim 1, wherein the airfoil comprises a plurality of film holes in fluid communication with the radial cooling channel.

13. The airfoil as in claim 12, wherein the plurality of film holes provide for bore cooling of the airfoil of at least one of the pressure side wall, the suction side wall, a leading edge portion, or a trailing edge portion.

14. The airfoil as in claim 12, wherein the plurality of film holes provide for film cooling of the trailing edge portion of the airfoil.

15. The airfoil as in claim 1, wherein the airfoil is a rotor blade.

16. The airfoil of claim 1, wherein the contour is a rounded contour.

17. The airfoil of claim 1, wherein the hot area of the airfoil outer surface is a plurality of hot areas of the airfoil outer surface, and wherein the thicker portion is a corresponding plurality of thicker portions.

18. A turbine nozzle of a turbine engine, comprising:
an outer band;
an inner band; and
an airfoil extending from the outer band to the inner band;
wherein the airfoil comprises an airfoil wall having an airfoil outer surface and an airfoil inner surface, the airfoil outer surface having at least one locally heated portion defined by a peak of a temperature gradient, and wherein a thickness is defined between the airfoil outer surface and the airfoil inner surface, with the thickness varying along at least one radial cross-section of the airfoil in a radial direction defined from the outer band to the inner band, wherein the airfoil wall has at least one thicker portion positioned in alignment with the peak of the temperature gradient, the thicker portion being thicker than a surrounding area of the airfoil wall and configured to provide a local reduction in a thermal-mechanical stress associated with the peak of the temperature gradient, wherein the thicker portion defines a contour on the airfoil inner surface.

19. The turbine nozzle as in claim 18, wherein the thicker portion on the airfoil wall is tailored to address a local heat flux magnitude resulting from a localized thermal load on a portion of the airfoil during use of the turbine engine.

20. The turbine nozzle as in claim 19, wherein the airfoil wall comprises a ceramic matrix composite formed from a plurality of plies, and wherein the thicker portion is defined within the leading edge portion by having more plies than adjacent sections.

* * * * *